United States Patent

Östling et al.

Patent Number: 6,152,604
Date of Patent: Nov. 28, 2000

[54] BEARING UNIT

[75] Inventors: Sture Östling; Krister Hörnfeldt; Uno Axelsson, all of Katrineholm, Sweden

[73] Assignee: SKF Mekan AB, Katrineholm, Sweden

[21] Appl. No.: 09/339,949

[22] Filed: Jun. 25, 1999

[30] Foreign Application Priority Data

Jun. 25, 1998 [SE] Sweden ................................. 9802262

[51] Int. Cl.[7] ................................................. F16C 23/08
[52] U.S. Cl. ........................... 384/478; 384/495; 384/538
[58] Field of Search .................................... 384/478, 495, 384/537, 538, 585

[56] References Cited

U.S. PATENT DOCUMENTS

| 4,596,477 | 6/1986 | Lundgren . |
| 5,011,306 | 4/1991 | Martinie . |
| 5,330,284 | 7/1994 | Persson . |

Primary Examiner—Lenard A. Footland
Attorney, Agent, or Firm—Burns, Doane, Swecker & Mathis, L.L.P.

[57] ABSTRACT

A bearing unit having a sealed single-row deep-groove ball bearing. The sealed single-row deep-groove ball bearing includes an outer race ring with a sphered outer envelope surface, a housing with a sphered bore for accommodating the bearing, an inner race ring with a taper bore, and a correspondingly tapered clamping sleeve provided in the bore of the inner race ring and having a flange provided on at least one side of the bearing. The flange has at least one bore, and at least one tightening device for causing a force on the bearing inner race ring for displacing the inner race ring along the clamping sleeve thereby causing a clamping effect between the inner race ring and the sleeve and between the sleeve and a shaft on which the bearing unit is mounted. The bore of the flange includes a threaded through-bore extending at an acute angle with respect to an axial direction of an inner envelope surface of the sleeve. The tightening device includes a set screw arranged to contact a side face of the inner race ring.

17 Claims, 2 Drawing Sheets

BEARING UNIT

This application corresponds to and claims priority under 35 U.S.C. § 119 with respect to Swedish Application No. 9802262-7 filed on Jun. 25, 1998, the entire content of which is incorporated herein by reference.

FIELD OF THE INVENTION

The present invention relates to sealed single deep-groove ball bearing units, and more particularly, to a device for attaching sealed single deep-groove ball bearing units to a shaft.

BACKGROUND OF THE INVENTION

Conventional insert bearing units incorporate a sealed single deep-groove ball bearing having an outer race ring with a sphered outer envelope surface, and a housing with a sphered bore for accommodating the bearings. Such bearings can accommodate moderate initial misalignment, but do not permit axial movement. Due to the specific application for these bearings, the bearing are affixed to a shaft in different manners, such as by a locking collar with a set screw, by an adapter sleeve, and by an appropriate interference fit.

EP 0 235 366 B1 and EP 0 388 378 B1 both disclose a bearing housing unit used for a self-aligning double row ball or roller bearing. The bearing units include a tapered clamping sleeve having a longitudinal slit and a flange provided on either side of the bearing. The bore of the inner ring of the bearing and the outer envelope surface of the clamping sleeve are both provided with mating tapering surfaces, such as saw-tooth-shaped wedging surfaces of a small longitudinal extent. Mounting and dismounting of the bearing on the shaft is carried out by axially displacing the bearing and the clamping sleeve relative to each other. Each side flange of the clamping sleeve is axially fixed on the sleeve, and is provided with threaded through-bores extending substantially in the longitudinal direction of the sleeve. The threaded through bores each receive a set screw.

To mount or dismount the bearing on the shaft, the bearing and the clamping sleeve are displaced relative to each other by screwing the set screws toward the bearing to transfer a force directly or indirectly to the bearing inner ring.

SUMMARY OF THE INVENTION

Generally speaking, the present invention provides a bearing unit having a simplified device for mounting or attaching the bearing unit to a shaft.

One aspect of the present invention pertains to a bearing unit having a sealed single-row deep-groove ball bearing. The sealed single-row deep-groove ball bearing includes an outer race ring with a sphered outer envelope surface, a housing with a sphered bore for accommodating the bearing, an inner race ring with a taper bore, and a correspondingly tapered clamping sleeve provided in the bore of the inner race ring and having a flange provided on at least one side of the bearing. The flange has at least one bore, and at least one tightening device for causing a force on the bearing inner race ring for displacing the inner race ring along the clamping sleeve thereby causing a clamping effect between the inner race ring and the sleeve and between the sleeve and a shaft on which the bearing unit is mounted. The bore of the flange includes a threaded through-bore extending at an acute angle with respect to an axial direction of an inner envelope surface of the sleeve. The tightening device includes a set screw arranged to contact a side face of the inner race ring.

Another aspect of the invention pertains to a sealed single-row deep-groove ball bearing unit having a clamping sleeve for clamping a shaft. The clamping sleeve has a tapered outer surface. An inner race ring and an outer race ring hold balls. The inner race ring has a tapered bore that receives the clamping sleeve. A flange is provided on a side of the inner race ring. The flange possesses a threaded bore having a center axis located at an acute angle with respect to a center axis of the clamping sleeve. A screw is threaded in the bore for acting against at least one of the clamping sleeve and the inner race ring to cause relative motion between the clamping sleeve and the inner race ring to thereby cause a clamping effect between the inner race ring and the clamping sleeve and between the clamping sleeve and the shaft.

Another aspect of the present invention pertains to a sealed single-row deep-groove ball bearing unit having a clamping sleeve for clamping a shaft and having a tapered outer surface. An inner race ring and an outer race ring hold balls. The inner race ring has a tapered bore for receiving the clamping sleeve. A flange is provided on a side of the inner race ring. The flange possesses a bore having a center axis located at an acute angle with respect to a center axis of the clamping sleeve. The bore receives a member that acts against at least one of the clamping sleeve and the inner race ring to cause relative motion between the clamping sleeve and the inner race ring to thereby cause a clamping effect between the inner race ring and the clamping sleeve and between the clamping sleeve and the shaft.

Other objects, advantages and features associated with the present invention will become readily apparent to those skilled in the art from the following detailed description. As will be realized, the invention is capable of other and different embodiments, and its several details are capable of modification in various obvious aspects, all without departing from the invention. Accordingly, the drawings and the description are to be regarded as illustrative in nature, and not limitative.

BRIEF DESCRIPTION OF THE DRAWINGS

The foregoing and additional features and characteristics associated with the present invention will become more apparent from the following detailed description considered with reference to the accompanying drawing figures in which like elements are designated by like reference numerals and wherein.

DETAILED DESCRIPTION OF THE PREFERRED EMBODIMENTS

Figure 1:
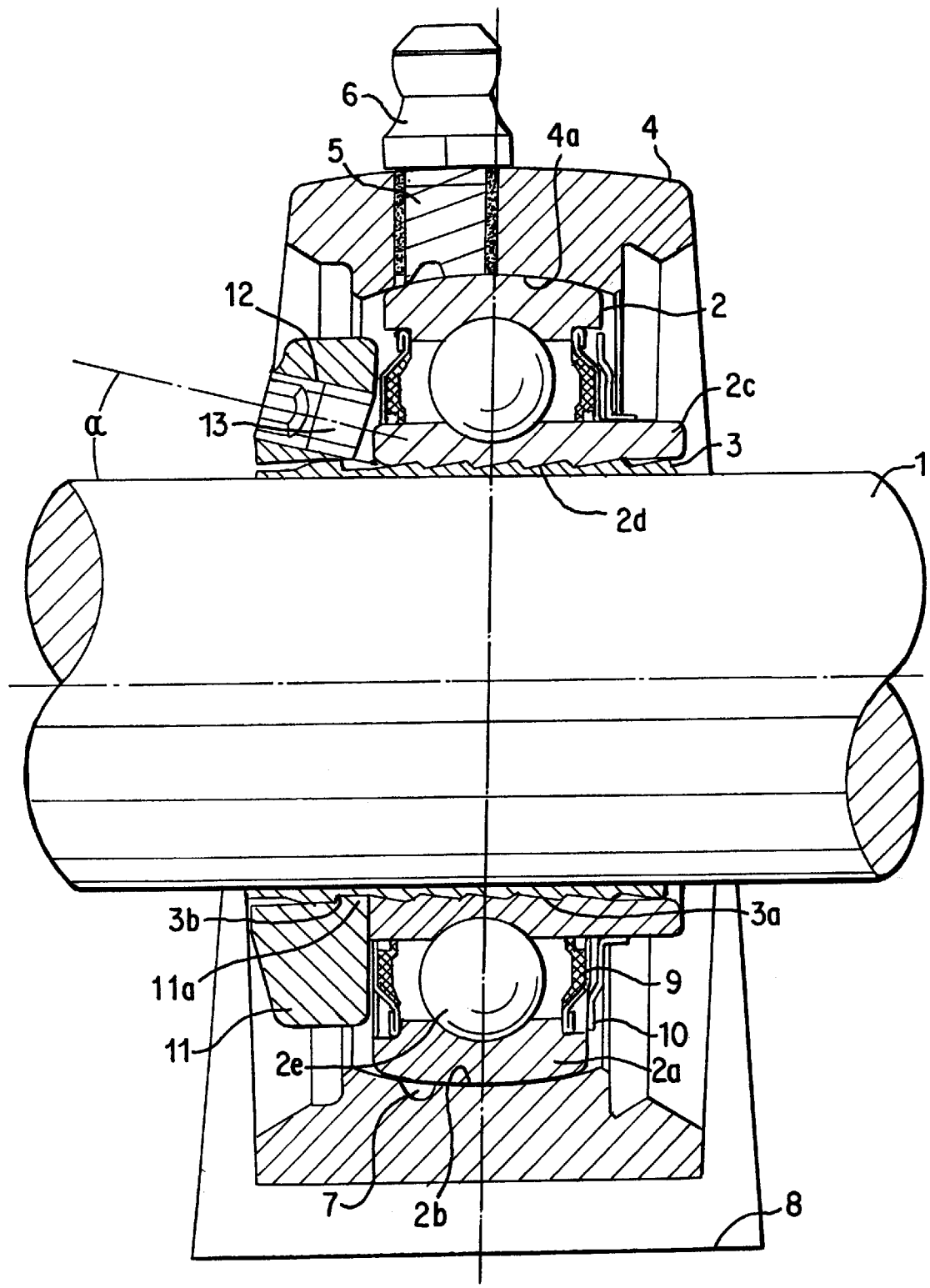
FIG. 1 illustrates a portion of a shaft with a bearing unit according to one embodiment of the present invention with an integrated mounting and attachment device shown in cross-section.
Figure 2:
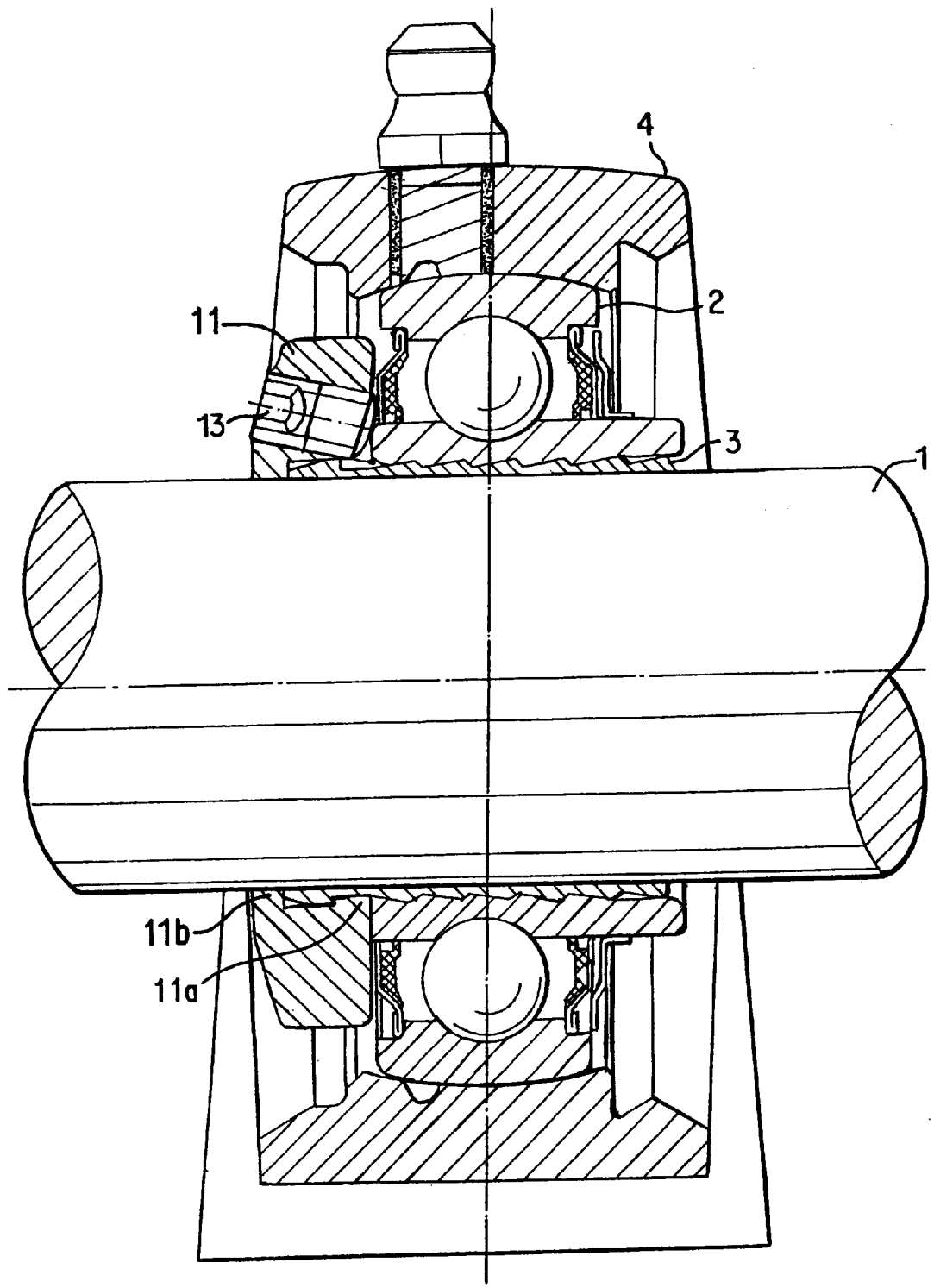
FIG. 2 is a corresponding view showing a slightly different embodiment of the present invention.

FIGS. 1 and 2 illustrate embodiments of bearing units according to the present invention. The bearing units are equipped with a mounting and attachment device whereby the bearing units can be easily and accurately mounted in a safe way, and this is achieved by the bearing units having the features described below.

FIG. 1 illustrates a portion of a cylindrical shaft 1, with a single row deep groove ball bearing 2 mounted thereon via a tapering clamping sleeve 3, and positioned in a bearing housing 4. The bearing 2 is an insert bearing, and it has an outer race ring 2a having a convexly curved outer envelope surface 2b. The housing 4 has an concave inner envelope surface 4a of substantially the same radius of curvature as the outer envelope surface of the outer race ring 2a. The deep-groove ball bearing 2, which itself can permit neither angular nor axial displacement between the bearing rings 2a, 2c, constitutes this insert bearing, and due to the provision of the mating curved surfaces of the outer race ring 2a and the housing 4, the insert bearing unit can permit slight angular misalignment between the housing and the bearing, such as can be caused by long shafts, thermal influence and so on.

The bearing housing 4 has at least one lubrication hole 5 with a lubricant nipple 6 and an annular lubricant groove 7 in the internal envelope surface 4a. The lower side of the housing 4 is designed as a foot portion 8 with which the bearing housing is positioned on a planar surface and attached to this with attachment means, such as bolts (not shown) or the like. The opposite or upper side of the bearing housing 4 in the embodiment shown has a convexly curved outer envelope surface.

As mentioned above, the bearing 2 is a deep groove ball bearing, having an outer ring 2a with a curved outer envelope surface 2b. The bearing 2 also includes an inner race ring 2c, which has a slightly tapering inner envelope surface 2d, and which has a larger axial length than the outer ring. Both bearing rings 2a, 2c have grooves provided in the confronting envelope surfaces and a number of balls 2e are positioned in these grooves.

Lip seals 9 are provided at both sides, axially outside the grooved portions of the bearing rings 2a, 2c, and, in the example illustrated, a flinger plate 10 is provided outside the seals to protect the seal lip. The device may have one, two or no such flinger plate.

The slightly tapering inner envelope surface 2d of the inner ring 2c cooperates with the correspondingly tapering outer envelope surface 3a of the clamping sleeve 3. The clamping sleeve 3 has a cylindrical inner envelope surface and is provided with a longitudinal slot (not shown in the drawing). In the embodiment illustrated, the confronting surfaces 2d and 3a of the inner race ring 2c and the clamping sleeve 3 both include mating saw-tooth longitudinal section profiles for giving the clamping surfaces as small a radial extension or thickness as possible, to thereby minimize the overall dimension or size of the bearing unit.

The clamping sleeve 3 is provided at one side with a radially outwardly projecting annular flange 11, which is secured to the sleeve 3 such that the flange cannot move axially relative to the sleeve 3 in at least one direction. In the embodiment illustrated this is achieved by an inner annular projection 11a. The inner annular projection 11a of the flange abuts an external annular shoulder 3b provided on the sleeve 3, which prevents the sleeve from moving relative to the flange 11 in a direction toward the right side of the bearing illustrated in FIG. 1. The flange 11 may of course also be designed as an integral portion of the sleeve 3, i.e., the flange 11 and sleeve 3 are one piece, but the divided or non-integral form illustrated in the drawing is preferred for manufacturing reasons and because it does not negatively influence the radial compressibility of the sleeve 3.

The flange 11 is provided with at least one bore, such as a threaded through-hole 12, that is arranged under an acute angle α to the axial direction of the inner envelope surface of the sleeve 3. Hence, the hole 12 has a center axis located at an acute angle α with respect to a center axis of the clamping sleeve 3. The flange 11 preferably includes more than one such through-hole 12, in which case, the through-holes are arranged at evenly spaced-apart positions along the flange.

A member, such as a threaded set screw 13, is located in the through-hole 12 and acts against the inner race ring 2c. The threaded set screw 13 is threaded in each through-hole 12 and when the screw(s) is/are screwed into their holes the forward end of each screw will press directly against the side face of the inner race ring 2c, i.e., against the radially extending face of the ring 2c substantially perpendicular to the outer surface of the ring, thereby urging the inner race ring 2c to move in a mounting direction to thereby increasing the clamping effect between itself, the clamping sleeve 3 and the shaft 1. Thus, the set screw 13 acts against the clamping sleeve to cause the inner race ring 2c to move relative to the clamping sleeve 3 to thereby cause a clamping effect between the inner race ring 2c and the clamping sleeve 3 and between the clamping sleeve 3 and the shaft 1. In this manner, a safe mounting and retention of the insert bearing unit is obtained in a simple and efficient manner, which can be standardized for most applications of such bearings. Besides this benefit, the angled positioning of the bore-holes 12 for the set screws 13 gives a number of further advantages. It will be appreciated that the set screw 12 can also act on the clamping sleeve 3 to cause the clamping sleeve 3 to move relative to the inner race ring 2c to thereby cause a clamping effect between the inner race ring 2c and the clamping sleeve 3 and between the clamping sleeve 3 and the shaft 1.

The oblique positioning of the bore-holes 12 advantageously provides a better space for the tool that tightens the set screws 13. Furthermore, the risk for wringing of the clamping sleeve 3 and/or the flange 11 and bearing inner ring 2c is substantially reduced. The driving up force is smaller in comparison to the surface pressure force, which also gives a better possibility to adapt the clamping force. Finally, the entire unit consisting of the sealed bearing, bearing housing, clamping sleeve and its flange with set screws can be delivered and handled as a self-contained unit, thereby reducing the number of details to handle substantially.

FIG. 2 illustrates another embodiment of a bearing unit according to the present invention. The bearing unit illustrated in FIG. 2 is similar to the bearing unit illustrated in FIG. 1, and thus only differences between the two bearing units are described.

The embodiment according to FIG. 2 differs from that according to FIG. 1 in that the flange 11, in addition to its inner annular projection 11a, also has a second internal annular projection 11b arranged axially outside the first annular projection 11a and adapted to embrace the outer end of the sleeve 3. The projections 11a, 11b prevent the clamping sleeve 3 from moving relative to the flange 11 in both directions along the center axis of the clamping sleeve. Hence, the clamping sleeve 3 will move when the flange is moved. By means of this second projection 11b, the dismounting or unattachment of the joint is simplified because the sleeve 3 will be carded along in the axial direction, when the flange 11 is subjected to an impact axially toward the bearing and when the set screw 13 has been untightened. Thus, it is an easy task to move the sleeve 3 in relation to the shaft 1 and the inner race ring of the bearing such that the grip between sleeve 3 and bearing ring will cease or at least be substantially reduced.

The principles, preferred embodiment and mode of operation of the present invention have been described in the foregoing specification. However, the invention which is intended to be protected is not to be construed as limited to the particular embodiment described. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

We claim:

1. A bearing unit comprising:
   a sealed single-row deep-groove ball bearing having:
   an outer race ring with a sphered outer envelope surface,
   a housing with a sphered bore for accommodating the bearing,
   an inner race ring with a taper bore, and
   a correspondingly tapered clamping sleeve provided in the bore of the inner race ring and having a flange provided on at least one side of the bearing, said flange having at least one bore, and at least one tightening means for causing a force on the bearing inner race ring for displacing the inner race ring along the clamping sleeve thereby causing a clamping effect between the inner race ring and the sleeve and between the sleeve and a shaft on which the bearing unit is mounted, the bore of the flange including a threaded through-bore extending at an acute angle with respect to an axial direction of an inner envelope surface of the sleeve, the tightening means including a set screw arranged to contact a side face of the inner race ring.

2. A bearing unit as claimed in claim 1, wherein confronting surfaces of the inner race ring and the clamping sleeve are saw-tooth-shaped wedging surfaces.

3. A bearing unit as claimed in claim 1, further comprising rubbing lip seals.

4. A bearing unit as claimed in claim 3, wherein each one of the lip seals is protected by a flinger plate positioned outside the seal in the axial direction of the bearing.

5. A bearing unit as claimed in claim 1, wherein the flange is provided with means for interconnecting the flange and the clamping sleeve to ascertain that the clamping sleeve follows axial movement of the flange along the shaft.

6. A sealed single-row deep-groove ball bearing unit comprising:
   a clamping sleeve for clamping a shaft and having a tapered outer surface;
   an inner race ring and an outer race ring for holding balls, said inner race ring having a tapered bore for receiving said clamping sleeve;
   a flange provided on a side of said inner race ring, said flange possessing a threaded bore having a center axis located at an acute angle with respect to a center axis of the clamping sleeve; and
   a screw threaded in said bore for acting against at least one of said clamping sleeve and said inner race ring to cause relative motion between said clamping sleeve and said inner race ring to thereby cause a clamping effect between said inner race ring and said clamping sleeve and between said clamping sleeve and the shaft.

7. A bearing unit as claimed in claim 6, wherein said flange is non-integral with said clamping sleeve.

8. A bearing unit as claimed in claim 6, wherein the tapered outer surface of the clamping sleeve and the tapered bore of the inner race ring include saw-tooth-shaped wedging surfaces.

9. A bearing unit as claimed in claim 6, said screw for acting against said inner race ring to move said inner race ring relative to said clamping sleeve to thereby cause the clamping effect.

10. A bearing unit as claimed in claim 6, wherein said flange and said clamping sleeve are non-integral, said flange including at least one projection and said clamping sleeve including a shoulder, said at least one projection preventing said sleeve from moving relative to said flange in at least one direction along said center axis of said clamping sleeve.

11. A bearing unit as claimed in claim 10, wherein said flange includes two projections, said projections preventing said sleeve from moving relative to said flange in two directions along said center axis of said clamping sleeve.

12. A bearing unit as claimed in claim 6, further comprising a housing having a sphered bore for receiving said inner race ring and said outer race ring.

13. A bearing unit as claimed in claim 6, wherein said flange includes a bore that receives said clamping sleeve.

14. A sealed single-row deep-groove ball bearing unit comprising:
   a clamping sleeve for clamping a shaft and having a tapered outer surface;
   an inner race ring and an outer race ring for holding balls, said inner race ring having a tapered bore for receiving said clamping sleeve;
   a flange provided on a side of said inner race ring, said flange possessing a bore having a center axis located at an acute angle with respect to a center axis of the clamping sleeve, said bore for receiving a member for acting against at least one of said clamping sleeve and said inner race ring to cause relative motion between said clamping sleeve and said inner race ring to thereby cause a clamping effect between said inner race ring and said clamping sleeve and between said clamping sleeve and the shaft.

15. A bearing unit as claimed in claim 14, wherein said bore of said flange is threaded and said member includes a threaded screw.

16. A bearing unit as claimed in claim 15, wherein said screw is threaded in said bore.

17. A bearing unit as claimed in claim 16, wherein said screw contacts a side surface of said inner race ring, said screw for moving said inner race ring relative to said clamping sleeve to thereby cause the clamping effect.

* * * * *